United States Patent [19]

Wilkinson

[11] Patent Number: 4,819,119

[45] Date of Patent: Apr. 4, 1989

[54] FAULTED PHASE SELECTOR FOR SINGLE POLE TRIPPING AND RECLOSING SCHEMES

[75] Inventor: Stanley B. Wilkinson, Havertown, Pa.

[73] Assignee: General Electric Company, King of Prussia, Pa.

[21] Appl. No.: 120,090

[22] Filed: Nov. 12, 1987

[51] Int. Cl.$^4$ .............................................. H02H 3/353
[52] U.S. Cl. ....................................... 361/76; 361/79; 361/82; 361/84
[58] Field of Search ........................ 361/76, 67, 77, 79, 361/80, 82, 84–87, 47, 64, 66, 63

[56] References Cited

U.S. PATENT DOCUMENTS

| | | | |
|---|---|---|---|
| 4,390,835 | 1/1983 | Elkateb et al. | 324/51 |
| 4,398,232 | 8/1983 | Elmore | 361/47 |
| 4,453,191 | 6/1984 | Wilkinson | 361/84 |
| 4,686,601 | 8/1987 | Alexander et al. | 361/76 X |

Primary Examiner—Todd E. DeBoer
Attorney, Agent, or Firm—Henry J. Polincinski; William H. Murray

[57] ABSTRACT

A phase selector for identifying a faulted phase in a three-phase alternating current electrical current distribution system generates, for each of the three phases, an output signal which includes the phasor sum of a signal related to a fault component of current flowing in the phase, a signal related to a negative sequence component of current flowing in the phase and a signal related to a zero sequence component of current flowing in the phase. The phase selector also generates at least one restraint signal which includes the phasor sum of a signal related to a fault component of current flowing in one of the two other phases of the three phase power distribution system, a signal related to a fault component of current flowing in the other of the two other phases of the three phase electrical power distribution system and a signal related to the negative sequence component of current flowing in the phase. A net operate signal is generated when the magnitude of the operate signal exceeds the magnitude of the restraint signal.

9 Claims, 3 Drawing Sheets

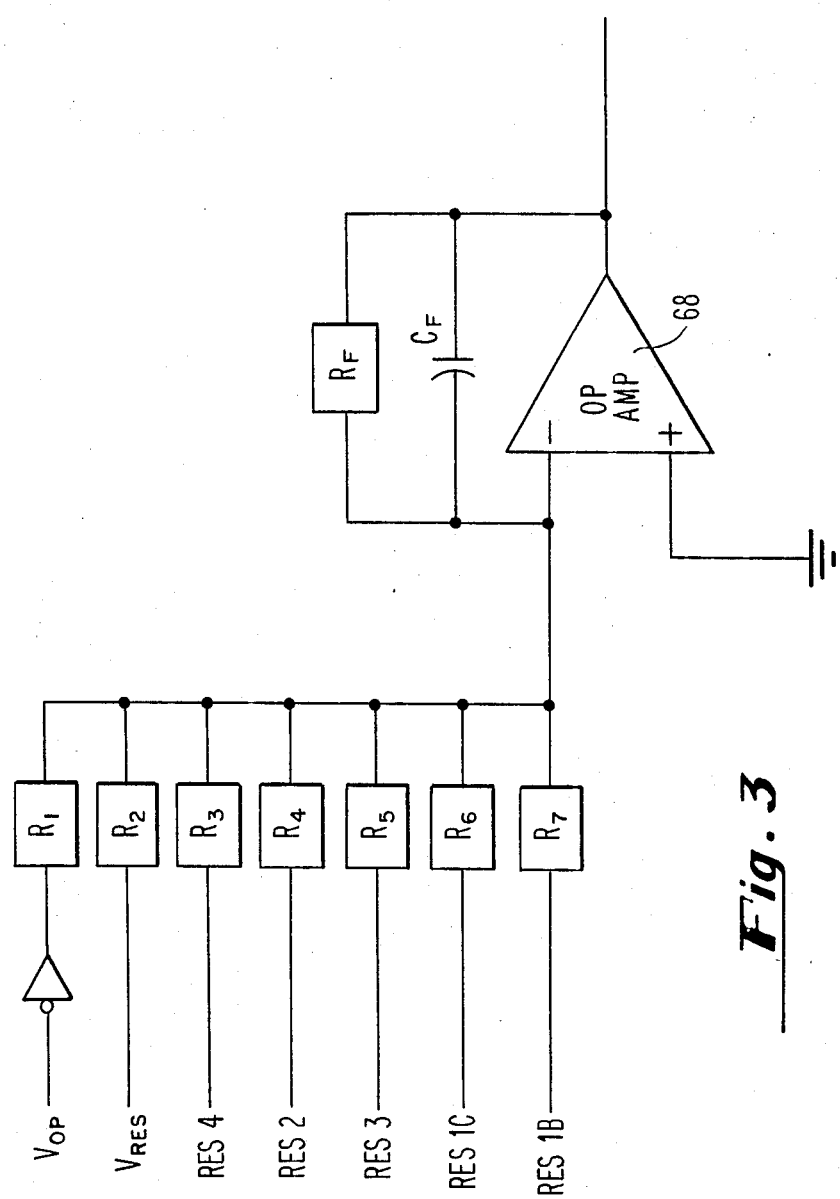

FAULTED PHASE SELECTOR FOR SINGLE POLE TRIPPING AND RECLOSING SCHEMES

BACKGROUND OF THE INVENTION

The present invention relates to protective relays for use in multi-phase AC power distribution systems and more particularly to phase selector relays for detecting faults related to a particular phase of the multi-phase AC power distribution system.

Phase selector relays are employed in protective systems for high voltage transmission lines for detection of the type of fault within the protected portion of the transmission lines. The phase selector for a particular phase, for example phase A, B or C, of a three-phase transmission line may be connected to the secondary current of the transmission line. Each particular phase selector should only detect faults related to its protected phase. For example, a phase selector relay A should only detect phase A when it is the faulted phase or one of the faulted phases. Furthermore, the phase selector for phase A should not be affected by a phase B-to-ground fault, a phase C-to-ground fault, or a phase B-to-C fault. The single phase discriminating detection operations are desired so that a fault related to a single phase will not cause a three-phase circuit breaker to be activated.

In addition, it is desired that the protection of the transmission line remain secure or stable for unfaulted conditions. For example, during the open pole time or period which the faulted phase or phases are disconnected from the transmission line, it is desired that the phase selector detect and responsd to a fault which may develop on an unfaulted phase of a transmission line. Also, it is desired that the phase-selector device does not operate incorrectly under maximum line-loading conditions, and it is preferable that the phase selector operate only for faults in the selected zones of the transmission line.

In the prior art one means of phase selection has been the use of single phase distance relays. A major disadvantage of distance relays is their inability to detect high resistance faults which dramatically limits the sensitivity of the scheme. A further problem of distance relays is the tendency, under very heavy load conditions, to select more than one phase, or the incorrect phase on single line to ground faults, thus requiring analysis to establish settings that preclude misoperation.

Another means of phase selection on single line to ground faults is the use of directional units comparing the phase relationship of the negative and zero sequence current components. These work well on short lines, but tend to become unreliable for remote end faults on long lines where the magnitude of the zero sequence component of current can be very small. With series capacitors, a remote end fault can result in a phase reversal of the zero sequence current relative to the positive and negative sequence currents, thus requiring analysis to establish settings of supervising overcurrent units to preclude incorrect operation should the series capacitors cause an apparent phase reversal in the zero sequence current. Further, the directional units will be unreliable on faults involving more than one phase. On double line to ground faults they select the unfaulted phase, and on line to line faults, the zero sequence component in the fault will be zero, but may exist in the relay due to CT errors, etc. Thus, the prior art phase selector had to be supplemented with another form of phase selection to provide three pole tripping on interphase faults. Typically this form of phase selection used a compensated positive sequence under voltage relay, which became very difficult to set with series capacitors in the line section.

Accordingly, it is an object of the present invention to provide a phase selector relay that accurately determines the phase or phases which are directly involved in the abnormal fault condition.

It is another object of the present invention to provide a phase selector relay, adapted to be coupled to a high voltage transmission line, which operates in a manner such that a fault related to a single phase of the high voltage transmission line does not cause multiple phase tripping.

It is a further object of the present invention to provide protection of the transmission line that remains secure for unfaulted conditions.

It is yet another object of the present invention to eliminate the need for settings in a phase selector relay.

It is still a further object of the present invention to provide a phase selector relay which operates on current only, for easier application on series compensated lines.

These and other objects of the present invention will become apparent to those skilled in the art upon consideration of the following description of the invention.

SUMMARY OF THE INVENTION

The present invention utilizes an operate signal which comprises the phasor sum of the fault component of the phase A current, the negative sequence component of the phase A current and the zero sequence component of the phase A current. A restraint signal which is the phasor sum of the fault component of the B phase current, the fault component of the C phase current and the negative sequence component of the A phase current is also utilized. A further restraint signal is obtained by taking a portion of the net operating signal in the other two phases and using it for restraint in the reference phase. The magnitude of the restraint signals are subtracted from the magnitude of the operate signal with the resultant signal being applied to an integrator. The output of the integrator is applied to a level detector which provides a phase A select signal when the output of the integrator exceeds a predetermined level.

The features of the invention believed to be novel are set forth particularly in the appended claims. The invention itself, however, both as to its organization and operation, together with further objects and advantages thereof, may best be understood by reference to the following description taken in conjunction with the accompanying drawings.

BRIEF DESCRIPTION OF THE DRAWINGS

FIG. 3 is a block diagram of a preferred embodiment of an integrated summing amplifier and integrator for use in the present invention.

DETAILED DESCRIPTION OF THE PREFERRED EMBODIMENT

Figure 1:
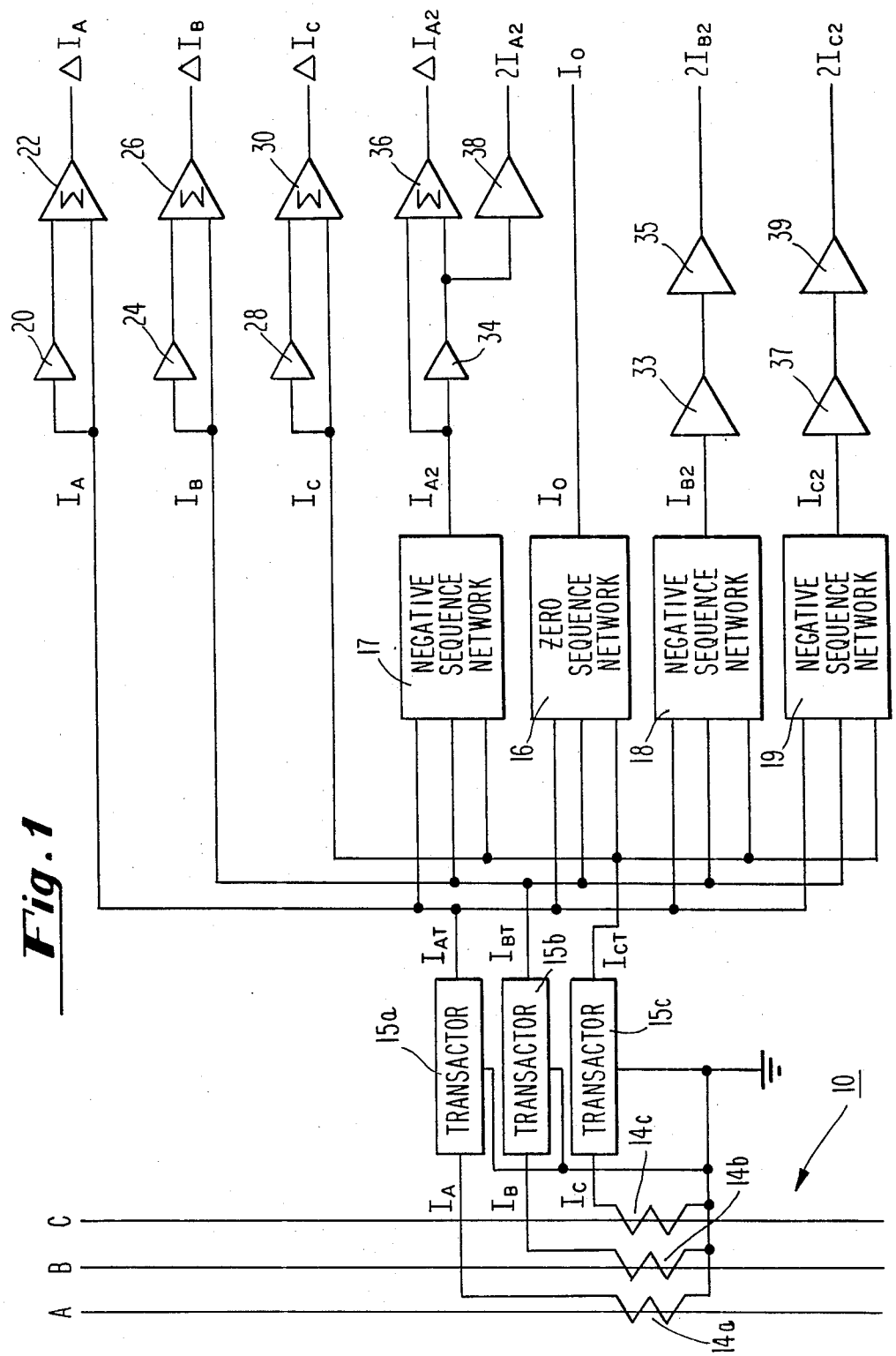
FIG. 1 is a block diagram of a signal generation portion of a preferred embodiment of the present invention.

Referring to FIG. 1, there is shown a three-phase alternating current electric power transmission line generally designated 10 having an A phase (A), a B phase (B), and a C phase (C). Each of the three phases has associated with it means 14 for sensing the current in that particular phase. In the preferred embodiment, current sensing means 14 comprises a current transformer. As shown in FIG. 1, a current sensing means is associated with each phase; means 14a being associated with phase A, 14b being associated with phase B and 14c being associated with phase C. It is to be understood that although a specific type of current sensing scheme is depicted in FIG. 1, other schemes known to those skilled in the art may be substituted for that depicted, the purpose being to obtain signals which are related to each phase current.

The output signal ($I_A$) from the current sensing means 14a is related to the current flowing in phase A; the output signal ($I_B$) from the current sensing means 14b is related to the current flowing in phase B; and the output signal ($I_C$) from the current sensing means 14c is related to the current flowing in phase C. The output signals $I_A$, $I_B$ and $I_C$ from the current sensing means 14a, 14b and 14c respectively, are coupled to the inputs of a first transactor 15a, a second transactor 15b and a third transactor 15c respectively. As is known in the art, the secondary voltage output of a transactor is related to the input current by a complex proportionality constant or a vector operator known as the transfer impedence of the transactor. For each of the transactors 15a, 15b, and 15c shown in FIG. 1, the transfer impedence is selected to be equal to a fixed transfer ratio and a fixed angle, for example 85°. Consequently, the output of each transactor 15a, 15b, and 15c is a signal which has, for example, a fixed 85° phase shift with respect to its input signal $I_A$, $I_B$ and $I_C$ respectively. A further detailed description of transactors may be had by reference to U.S. Pat. No. 3,374,399, issued to Dewey, which patent is assigned to the assignee of the present invention and the teachings of which are incorporated by reference in this detailed description as if fully set forth herein.

The outputs from the first transactor 15a, the second transactor 15b and the third transactor 15c are coupled to the inputs of a zero sequence network 16, a first negative sequence network 17, a second negative sequence network 18 and a third negative sequence network 19. It is well understood by those skilled in the art of electrical power transmission relaying that phase currents in a three-phase alternating current circuit can be resolved into three sets of symmetrical balanced current vectors known as positive sequence, negative sequence and zero sequence components. It is also well known that certain circuits called "symmetrical component networks" can be connected to a three-phase electrical power system to provide an output signal that is proportional to the magnitude of the selected one of the three sequence components of current. The zero sequence network 16 and negative sequence networks 17, 18 and 19 are such networks.

The output of zero sequence network 16 is the zero sequence component $I_O$ of the phase currents. The output of the first negative sequence network 17 is the negative sequence component $I_{A2}$ of the current flowing in the A phase; the output of the second negative sequence network 18 is the negative sequence component $I_{B2}$ of the current flowing in the B phase; and the output of the third negative sequence network 19 is the negative sequence component $I_{C2}$ of the current flowing in the C phase. Sequence networks of this type are disclosed in U.S. Pat. No. 4,342,062. Further detailed descriptions of symetrical component networks can be had by reference to U.S. Pat. No. 3,992,651 issued to Hodges; and U.S. Pat. No. 4,034,269 issued to Wilkinson, both of which patents as well as U.S. Pat. No. 4,342,062 are assigned to the assignee herein and the teachings of all are incorporated into this detailed description by reference as if fully set forth herein.

The output signal $I_{AT}$ from the first transactor 15a is also coupled to the input of a first memory filter 20 and one input of a first two-input summing amplifier 22. The output signal $I_{BT}$ from the second transactor 15b is also coupled to a second memory filter 24 and one input of a second two input summing amplifier 26. The output signal $I_{CT}$ from the third transactor 15c is also coupled to the input of a third memory filter 28 and one input of a third two-input summing amplifier 30. The output of the first memory filter 20 is connected to the other input of the first two input summing amplifier 22. The output of the second memory filter 24 is connected to the other input of the second two input summing amplifier 26. The output of the third memory filter 28 is connected to the other input of the third two input summing amplifier 30.

The output of the first negative sequence network 17, which is the negative sequence component of the current flowing in the A phase ($I_{A2}$) is coupled to a fourth memory filter 34 and one input of a fourth two input summing amplifier 36. The output of the fourth memory filter 34 is connected to the other input of the fourth two input summing amplifier 36 and the input of a first amplifier 38. The output $I_{B2}$ of the second negative sequence network 18 is coupled to a fifth memory filter 33. The output of the fifth memory filter 33 is coupled to the input of a second amplifier 35. The output of the second amplifier 35 is the signal $2I_{B2}$. The output $I_{C2}$ of the third negative sequence network 19 is coupled to a sixth memory filter 37. The output of the sixth memory filter 37 is coupled to the input of a third amplifier 39. The output of the third amplifier 39 is the signal $2I_{C2}$.

In the preferred embodiment, the memory filters 20, 24, 28, 33, 34 and 37 are each a multiple feedback band pass filter with the center frequency selected equal to the rated frequency of the power system, which frequency is typically 50Hz or 60Hz. Each of the memory filters 20, 24 and 28, preferably has a Q approximately equal to 4 and a gain of $-1$. With a Q of 4, a change in the output signal from the memory filter lags a corresponding change to the input thereby providing short term memory of the pre-change signal. Although a higher Q would provide a longer time constant and a longer term memory, it would create a greater phase variation upon occurrence of a change in frequency, which would cause generation of a signal from the summing amplifier to which the output of the memory filter is coupled. Such a signal could create an erroneous operation of the relay since it could be generated as a result of an expected variation in frequency and not as a result of a fault.

The fourth memory filter 34, the fifth memory filter 33 and the sixth memory filter 37 each preferably has a Q of 2 and a gain of $-1$ and each is used to filter transients, which typically appear immediately following inception of the fault, from the $I_{A2}$, $I_{B2}$ and $I_{C2}$ signals respectively. With a Q of 2, each memory filter will reduce the magnitude of the aforementioned transients while enabling the filtered signals to rapidly achieve its post fault magnitude for the reason set forth below. In the preferred embodiment, the summing amplifiers 22, 26, 30 and 36 each comprise an operational amplifier whose output is equal to the sum of the inputs. Each of the amplifiers 35, 38 and 39 is preferably an operational amplifier having a gain of 2.

Under normal, steady state conditions, with load current flowing in the transmission line with no faults, the output from the first memory filter 20 will be $-I_A$; consequently, the output from the first summing amplifier 22 ($\Delta I_A$) will be zero. Similarly the output from the second two input summing amplifier 26 ($\Delta I_B$), the output from the third two input summing amplifier 30 ($\Delta I_C$) and the output from the fourth two input summing amplifier 36 ($\Delta I_{A2}$) will each be zero.

Upon occurrence of a fault, for example in the A phase, the output of the first memory filter 20 will be equal to $-1$ times the magnitude of the prefault current since the output of the memory filter 20, which has a gain $-1$, will remain unchanged initially. Consequently, the output of the first two input summing amplifier 22 ($\Delta I_A$) will be equal to the magnitude of the phase A current following occurrence of the fault minus the magnitude of the prefault phase A load current. Therefore, $\Delta I_A$ is substantially equal to the magnitude of the fault component of the phase A current $I_A$. Similarly, the output of the fourth two input summing amplifier 36 ($\Delta I_{A2}$) is substantially equal to the fault component of the negative sequence component of the phase A current $I_{A2}$. Likewise, if a fault occurs in the B phase, the output $\Delta I_B$ of the second two input summing amplifier 26 will be substantially equal to the magnitude of the fault current of the phase B current $I_B$; and, if the fault occurs in the C phase, the output $\Delta I_C$ of the third two input summing amplifier 30 will be substantially equal to the fault component of the B phase current $I_B$.

Figure 2:
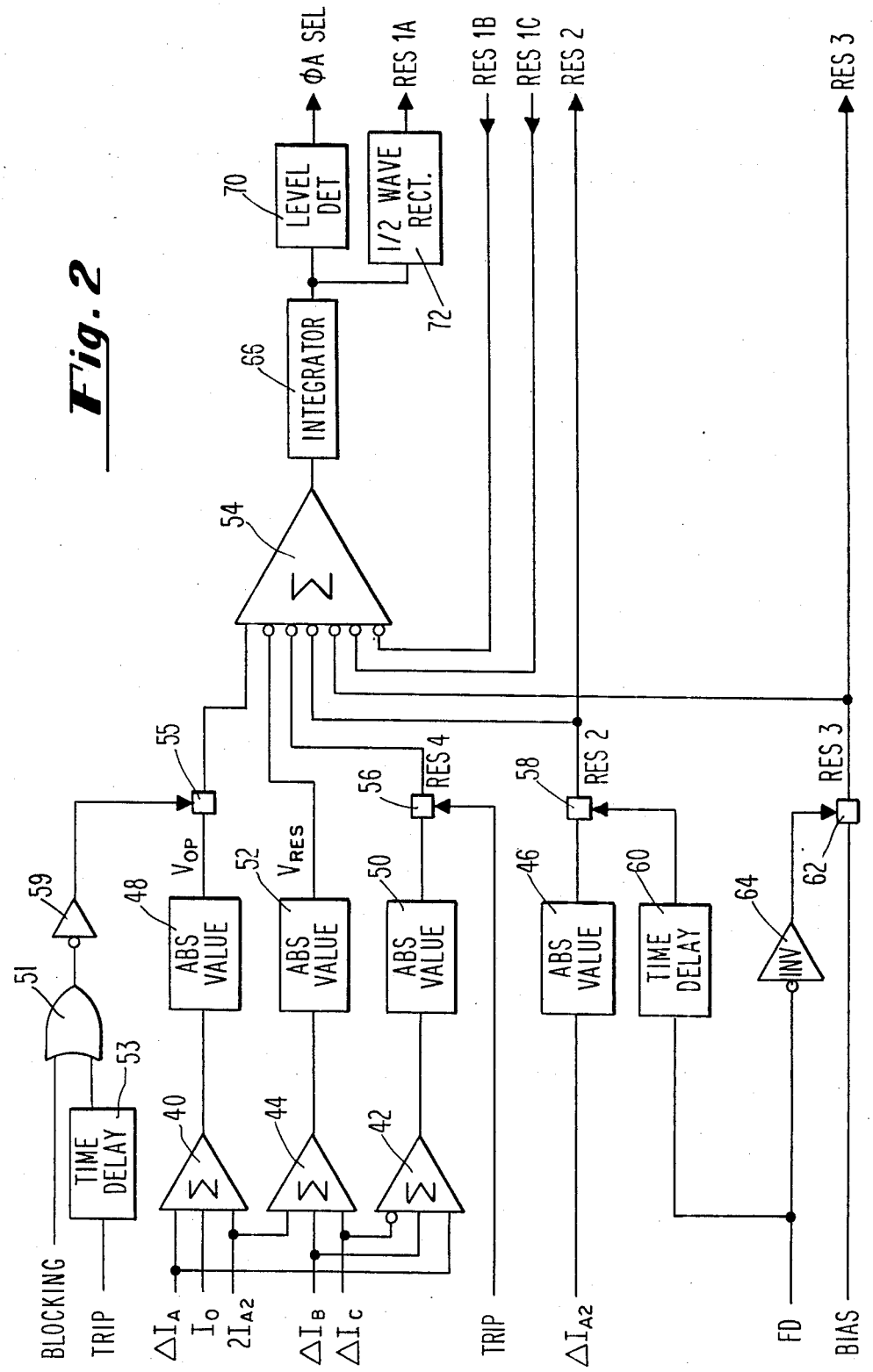
FIG. 2 is a block diagram of a signal utilization portion of the preferred embodiment of the present invention.

Referring now to FIG. 2, there is shown a signal utilization portion of the preferred embodiment of the present invention. For the sake of clarity, FIG. 2 relates only to phase A. However, it shall be understood that there are also signal utilization portions of the present invention, in accordance with FIG. 2, which relate to phases B and C; and the description which follows, although set forth with respect to phase A only, is also applicable to phase B and phase C portions which have been omitted for clarity's sake. As shown in FIG. 2, the output $\Delta I_A$ of the first two input summing amplifier 22 (see FIG. 1) is coupled to an input of the first three input summing amplifier 40 and an input of the second three input summing amplifier 42. The output $\Delta I_B$ of the second two input summing amplifier 26 (see FIG. 1) is coupled to a second input of the second three input summing amplifier 42 and an input of a third three input summing amplifier 44. The ouput $\Delta I_C$ of the third two input summing amplifier 30 (see FIG. 1) is coupled to a third, inverting, input of the second three input summing amplifier 42 and a second input of the third three input summing amplifier 44. The output $I_O$ of the zero sequence network 16 (see FIG. 1) is coupled to a second input of the first three input summing amplifier 40.

The output $2I_{A2}$ of the first amplifier 38 (see FIG. 1) is coupled to a third input of the first three input summing amplifier 40 and a third input of the third three input summing amplifier 44. In the preferred embodiment, the first 40, second 42 and third 44 three input summing amplifiers are each an operational amplifier whose output is equal to the vector sum of the input. Consequently, the output of the first input summing amplifier is equal to $\Delta I_A$ plus $2I_{A2}$ plus $I_O$. The output of the second three input summing amplifier 42 is equal to $\Delta I_A$ plus $\Delta I_B$ minus $\Delta I_C$. The output of the third three input summing amplifier 44 is equal to $2I_{A2}$ plus $\Delta I_B$ plus $\Delta I_C$.

The output $\Delta I_{A2}$ of the fourth two input summing amplifier 36 (see FIG. 1) is coupled to the input of a first absolute value network 46. The output of the first three input summing amplifier 40 is coupled to the input of a second absolute value network 48. The output of the second three input summing amplifier 42 is coupled to the input of a third absolute value network 50. The output of the third three input summing amplifier 44 is coupled to the input of a fourth absolute value network 52. In the preferred embodiment, each of the absolute value networks 46, 48, 50 and 52 comprises a full wave precision rectifier of the type shown and described on pages 206 and 207 of the publication entitled "IC Op-Amp Cookbook", Second Edition, W. G. Jung, Howard Sams & Co., Inc. which is incorporated in the detailed description by reference as if fully set forth herein.

The output of each absolute value network is equal to the absolute value of the input signal. Consequently, the output $V_{OP}$ of the second absolute value network 48 is equal to the absolute value of the sum of $\Delta I_A$ plus $2I_{A2}$ plus $I_O$. Similarly, the output $V_{RES}$ of the fourth absolute value network 52 is equal to the absolute value of the sum of $2I_{A2}$ plus $\Delta I_B$ plus $\Delta I_C$. The output RES4 of the third absolute value network 50 is equal to the absolute value of the sum of $\Delta I_A$ plus $\Delta I_B$ minus $\Delta I_C$.

The output $V_{OP}$ of the second absolute value network 48 is coupled to a non-inverting input of a seven input summing amplifier 54 through a first electronic switch 55. The output RES4 of the third absolute value network 50 is coupled to a first inverting input of a seven input summing amplifier 54 through a second electronic switch 56. In the preferred embodiment, the seven input summing amplifier 54 is an operational amplifier whose output is equal to the algebraic sum of the input. The output RES2 of the first absolute value network 46 is coupled to a second inverting input of the seven input summing amplifier 54 through a third electronic switch 58. In the preferred embodiment, the electronic switches 55, 56 and 58 are each controlled by a signal applied to a control input. Application of the control signal will close the switch thereby applying the signal at the input directly to the output. Removal of the control signal will open the switch.

A blocking signal is coupled to an input of an OR gate 51. A trip signal TRIP is coupled to another input of the OR gate 51 through a time delay circuit 53, which preferably comprises an R-C time delay circuit. The output of the OR gate 51 is coupled to the control input of the first electronic switch 55 through a first invertor 59. The first invertor 59 is preferably a logical invertor. A trip signal (TRIP) is coupled to the control input of the second electronic switch 56. A fault detector signal (FD) is coupled to the control input of the third electronic switch 58 through a second time delay circuit 60. In the preferred embodiment the second time delay circuit 60 comprises an R-C time delay circuit. The output of the second time delay circuit 60 is a signal having a predetermined delay with respect to the input signal, this delay being 25 milliseconds in the preferred embodiment. The FD signal is also coupled to a control input of a fourth electronic switch 62 through a second inverter 64. In the preferred embodiment, the fourth electronic switch 62 functions in the same manner as do the electronic switches 55, 56 and 58. The second inverter 64 is preferably a logical inverter.

A BIAS signal is coupled to the input of the fourth electronic switch 62. The output RES3 of the fourth electronic switch 62 is coupled to a third inverting input of the seven input summing amplifier 54. The output RES3 of the fourth electronic switch 62 is also coupled to an inverting input of the seven input summing amplifiers associated with the B phase and C phase networks. The output RES2 of the third electronic switch 58 is coupled to a fourth inverting input of the seven input summing amplifier 54. The output RES2 is also coupled to an inverting input of the seven input summing amplifier associated with each of the B and C phase networks. A RES1B signal from the B phase network is coupled to a fifth inverting input of the seven input summing amplifier 54. A RES1C input from the C phase network is coupled to the sixth inverting input of the seven input summing amplifier 54.

The output of the seven input summing amplifier 54 is coupled to an "integrator" circuit 66. In the preferred embodiment, the "intergrator" circuit 66 and the summing network 54 utilize a common operational amplifier 68 as shown in FIG. 3. As shown in FIG. 3, each of the seven inputs to the summing amplifier is coupled to one terminal of an associated resistor, $R_1$ through $R_7$. The other terminals of resistors $R_1$ through $R_7$ are connected together and to an inverting input of the operational amplifier 68. The non-inverting input of the operational amplifier 68 is connected to ground. A feedback resistor $R_F$ is connected in parallel to a feedback capacitor $C_F$ with this parallel combination being connected between the output of the operational amplifier 66 and the inverting input.

Referring again to FIG. 2, the output of the "integrator" circuit 66 which, in the preferred embodiment is the output of operational amplifier 68 (see FIG. 3), is coupled to an input of a level detector 70 and an input of a half-wave rectifier 72. The output of the level detector 70, which appears when the input exceeds a predetermined level, is a signal ($\phi$A SEL) which indicates that phase A is faulted and which is utilized by the relay system to direct a trip signal to the $\phi$A pole of a circuit breaker which disconnects the phase A portion of the protected zone from the transmission system. The output RES1A of the half-wave rectifier 72 is coupled to an inverting input of the seven input summing amplifier in each of the phase B and phase C networks. The half-wave rectifier 72 produces an output when the output of the integrator 66 is in the trip polarity.

The phase selector relay of the present invention operates as follows. This description, for purposes of clarity, is made with respect to phase A only of a three phase AC power transmission system. However, the description is equally applicable to phases B and C. Assuming the normal situation where there are no faults within the protected zone of the AC electrical power transmission line, the quantities $\Delta I_A$, $\Delta I_B$, $\Delta I_C$, and $\Delta I_{A2}$ will each be substantially equal to zero since the output of the memory filters 20, 24, 28 and 34 are substantially equal to the input in magnitude and 180° out of phase. Consequently, the output of each of the two input summing amplifiers 22, 26, 30 and 36 which is the sum of the output of the memory filter and the input, will be substantially equal to zero. Furthermore, the quantities $2I_{A2}$ and $I_O$ will be substantially equal to zero since, in a three phase power transmission system with a balanced load, the negative and zero sequence components of the currents are intentionally kept at very small values in order to minimize transmission line losses.

Assuming now that a fault occurs in the A phase of the protected zone of the three phase power transmission line, the signal $\Delta I_A$ will assume a positive value, substantially equal to the fault current component of the phase A current signal $I_A$ since the output of the memory filter 20, immediately following the phase A fault, will be substantially equal to the prefault value while the current signal $I_A$ is equal to the prefault value plus the fault current component. Consequently, the output $\Delta I_A$ of the two input summing amplifier 22 will be the post-fault current minus the pre-fault current, the difference of which is substantially equal to the fault current component of the phase A current. Since, in this initial hypothetical case, phases B and C remain unfaulted, the signals $\Delta I_B$ and $\Delta I_C$ will remain substantially equal to zero.

The signals $2I_{A2}$ and $I_O$ will have an effective value since the fault in phase A will produce zero and negative sequence components having finite magnitudes which substantially exceed their prefault minimal values.

Referring now to FIG. 2, the $\Delta I_A$, $I_O$ and $2I_{A2}$ signals are algebraically summed by the first three input summing amplifier 40. These signals tend to be in phase, or nearly in phase upon occurrence of phase A fault in the protected zone. By symmetrical component theory, the faulted phase current sequence components must be in phase in the fault; otherwise, they would not cancel out to give zero current in the other two phases.

Since the output of the first three input summing amplifier 40 is coupled to the input of the second absolute value network 48, the output signal $V_{OP}$ from the absolute value network 48 is a signal of one polarity which is positive in the preferred embodiment. The $V_{OP}$ signal is applied to the seven input summing amplifier 54. Because, as previously explained, the signals $\Delta I_B$ and $\Delta I_C$ are substantially zero, the output of the second three input summing amplifier will be substantially equal to the input signal $2I_{A2}$. This output is coupled to the fourth absolute value network 52 whose output, $V_{RES}$, is a restraint signal having a single polarity, which is also positive in the preferred embodiment. The restraint signal $V_{RES}$ is coupled to an inverting input of the seven input summing amplifier 54.

Also, since the signals $\Delta I_B$ and $\Delta I_C$ are zero, the output of the second three input summing amplifier 42 is substantially equal to the input signal $\Delta I_A$. This signal is coupled to the input of the third absolute value network 50 which provides an output signal RES4 having one polarity, which is preferably positive. The RES4 signal is coupled to an inverting input of the seven input summing amplifier 54 only upon occurrence of a TRIP signal applied to the control input of the first electronic switch 56. This signal is applied when the trip command is transmitted to the $\phi$A pole of the breaker. It provides restraint after the $\phi$A selector has completed its intended operation, and provides a stabilizing restraint in the two unfaulted phase selectors to overcome the natural frequency transients occuring when the phase A current is interrupted.

Due to the fault in phase A, signal $\Delta I_{A2}$ will be substantially equal to the fault current component of the negative sequence component of the phase A current since the output of the memory filter 34 is substantially equal to the prefault negative sequence component which, when subtracted from the post-fault negative sequence component of the phase A current by the two input summing amplifier 36 will yield the fault current component. The $\Delta I_{A2}$ signal is applied to the input of the first absolute value network 46 whose output RES2 is a signal having a single polarity, preferably positive. This RES2 signal is coupled to an inverting input of the seven input summing amplifier 54 only upon occurrence of the FD signal which still exists after the predetermined time delay of the time delay circuit 60 expires.

The purpose of this restraint signal is to provide security in the unfaulted $\phi$SELS against natural frequency transients with long time constants which are likely to occur on long lines, and particularly series compensated lines. The time delay allows the fundamental frequency component of $I_{A2}$ to be largely attenuated by the delta circuit before the restraint is applied. The BIAS signal is switched through the third electronic switch 62 to become the RES3 signal until the FD signal appears which then removes the control signal from the third electronic switch 62 since the FD signal is applied to the control input through the inverter 64. As a result, in the absence of the fault detector FD signal, a restraint RES3 is applied to an inverting input of the seven input summing amplifier 54. The presence of the FD signal will cause the restraint to be removed. This restraint provides an initial stabilizing restraint signal in the integrator to ensure against misoperation on noise at the fault inception and to prevent operation on the very small signals due to load unbalance.

As indicated previously, the output of the seven input summing amplifier 54 is the algebraic sum of its inputs. Consequently, there will be an output from the summing amplifier 54 only when the operating input signal $V_{OP}$ exceeds the sum of the restraint signals $V_{RES}$, RES2, RES3, RES4, RES1B and RES1C. In the case of RES2, the phase selector is normally operated before the time delay period expires. In the case of RES4, a phase selector must have operated before this signal is gated.

The first electronic switch 55 is provided in the operate circuit to interrupt the operate signal $V_{OP}$. Primarily it is intended to prevent build-up of operate energy in the phase selectors when a fault occurs behind the relay location, and is detected by the reverse looking blocking units in the overall relay scheme. A further advantage of this switch is to supplement the restraint signals RES4 and RES2 when the faulted phase is opened to prevent misoperation of the unfaulted phases on the transients associated with fault clearing. Thus the switch 55 is switched off by the trip signal delayed until approximately $\frac{1}{2}$ cycle before the breaker clears.

These individual components of the restraint signal $V_{RES}$ are selected so that they tend to cancel each other in the faulted phases. For single line to ground faults, the restraint signals in the faulted phase tend to cancel only on remote end faults where the ratio of zero sequence to negative sequence current can be quite low. In the case of the remote phase A to ground fault, $\Delta I_B$ and $\Delta I_C$ will be approximately 180° out of phase with $\Delta I_A$ and $2I_{A2}$. In the unfaulted phases, the restraint signals tend not to cancel providing improved discrimination between the faulted and unfaulted phases. In the case of phase-to-phase faults, the unfaulted phase selector has an operate signal equal to the restraint signal. To ensure restraint in this case, a portion of the net operate signal in one phase selector (RES1A for the $\phi$A phase selector shown in FIG. 2.) is introduced as a restraint signal into the other two phase selectors. Note that in FIG. 2, the portion of the net operate signal received as a restraint from the other two phases are the RES1B and RES1C signals.

Normally, the addition of phase quantities and sequence quantities is greatly affected by load current. This is circumvented by using the change in the phase current which is, in effect, the fault component of the phase current ($\Delta I_A$, $\Delta I_B$ and $\Delta I_C$) instead of the total phase current. This method of obtaining the fault component of phase current results in only transient operation for phase to phase faults. To provide a steady state output, the scheme logic is arranged such that three pole tripping is initiated in the absence of any phase selector output if the negative sequence distance relay operates. For the same reason, operation of the positive sequence distance relay results in three pole tripping. However, the selection of input signals to the phase selector comparator is influenced by the desirability of maintaining a steady state output on single line-to-ground faults which, in the case of very high resistance faults, may be slower in clearing.

As can be seen from above, the present invention provides a phase selector relay that accurately determines the phase or phases which are directly involved in the abnormal condition. The relay of the present invention also eliminates the need for settings and operates on current only for easier application on series compensated lines.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention that come within the true spirit and scope of my invention.

What is claimed is:

1. A phase selector including means for identifying a faulted phase within a protected zone of a three phase alternating current electrical power distribution system, said faulted phase identifying means comprising, for each of said three phases:
   (a) means for generating an operate signal comprising the phasor sum of:
      (i) a signal related to a fault component of current flowing in an associated phase;
      (ii) a signal related to a negative sequence component of current flowing in said associated phase; and
      (iii) a signal related to a zero sequence component of current flowing in said associated phase;
   (b) means for generating at least one restraint signal comprising the phasor sum of:
      (i) a signal related to a fault component of current flowing in one of the two other phases of said three phase power distribution system;
      (ii) a signal related to a fault component of current flowing in the other of the two other phases of said three phase power distribution system; and
      (iii) said signal related to the negative sequence component of current flowing in said associated phase; and (c) means for generating a net operate signal when the magnitude of said operate signal exceeds the magnitude of the sum of said at least one restraint signal.

2. The phase selector in accordance with claim 1, further comprising:
   (a) a second restraint signal comprising at least a portion of the net operate signal generated with respect to each of the other two phases in said three phase electrical power distribution system.

3. The phase selector in accordance with claim 2, additionally comprising means for generating a third restraint signal upon receipt of a faulted phase circuit breaker trip signal, said third restraint signal comprising the phasor sum of:
   (a) the signal related to the fault component of current flowing in said associated phase;
   (b) plus the signal related to the fault component of current flowing in one of the two other phases of said three phase power distribution system; and
   (c) minus the signal related to the fault component of current flowing in the other of the two other phases of said three phase power distribution system.

4. The phase selector in accordance with claim 3 additionally comprising means for applying a fourth restraint signal, related to a fault component of the negative sequence component of current flowing in said associated phase, upon receipt of a fault detector signal having a duration which exceeds a predetermined time.

5. The phase selector in accordance with claim 4 additionally comprising:
   (a) means for applying a fifth restraint signal; and
   (b) means for removing said fifth restraint signal for said predetermined time duration upon receipt of said fault detector signal.

6. The phase selector in accordance with claim 5 wherein said fifth restraint signal comprises a direct current bias signal.

7. The phase selector in accordance with claim 1, additionally comprising energy comparision means adapted to receive said net operate signal, said energy comparison means comprising:
   (a) integrator circuit means comprising an operational amplifier having an input connected to receive said signal generated by said means for generating a net operating signal, an output, and a feedback circuit connected between said input and said output, said feedback circuit comprising resistance means and capacitance means electrically connected in parallel; and
   (b) level detector means for generating a phase select signal when the magnitude of an output signal from the output of said operational amplifier exceeds a predetermined level.

8. The phase selector in accordance with claim 1, additionally comprising means for interrupting said operate signal upon occurrance of a fault outside of said protected zone.

9. The phase selector in accordance with claim 8, further comprising means for interrupting said operate signal a predetermined time following receipt of a faulted phase circuit breaker trip signal.

* * * * *